R. A. WEAGANT.
RADIOSIGNALING APPARATUS.
APPLICATION FILED FEB. 1, 1918.

1,389,800.

Patented Sept. 6, 1921.
3 SHEETS—SHEET 1.

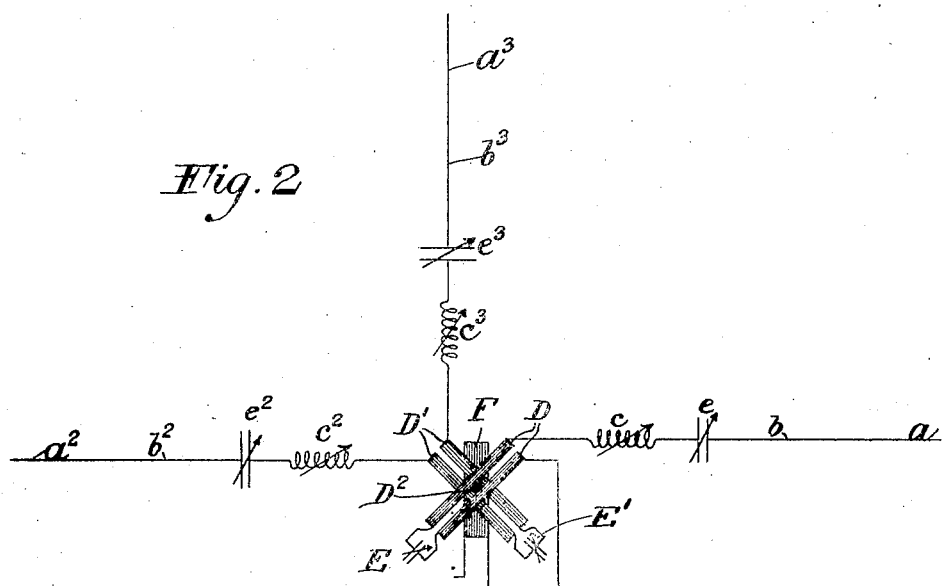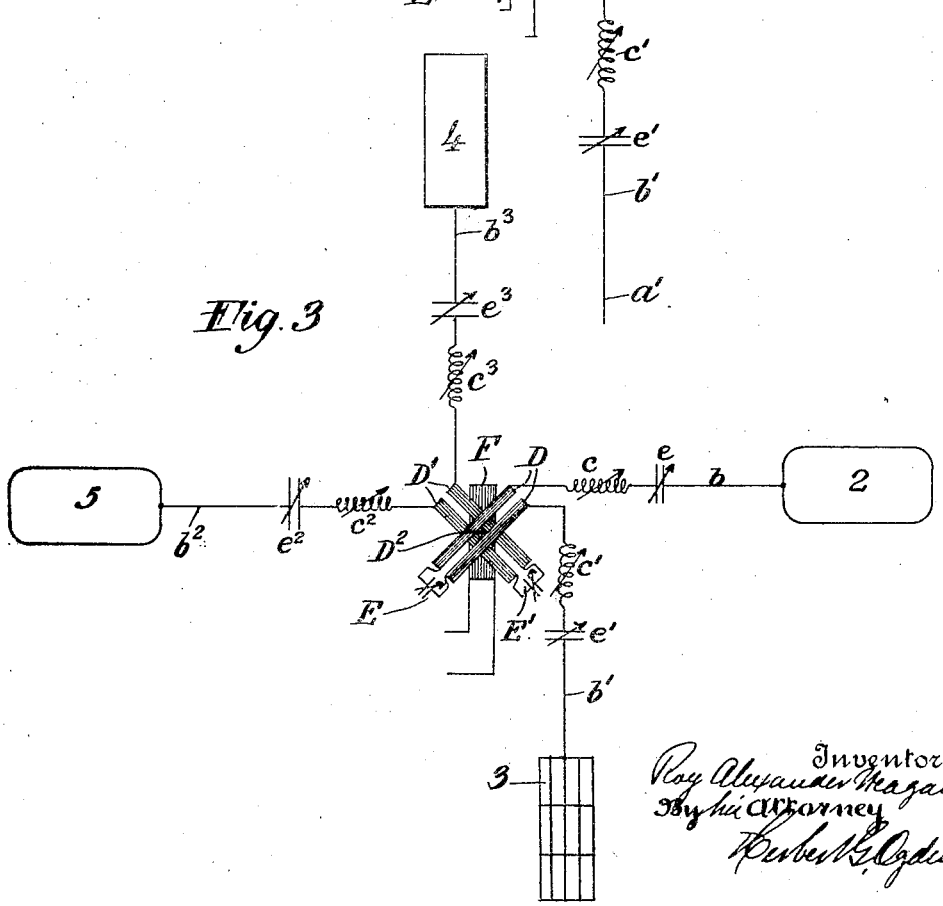

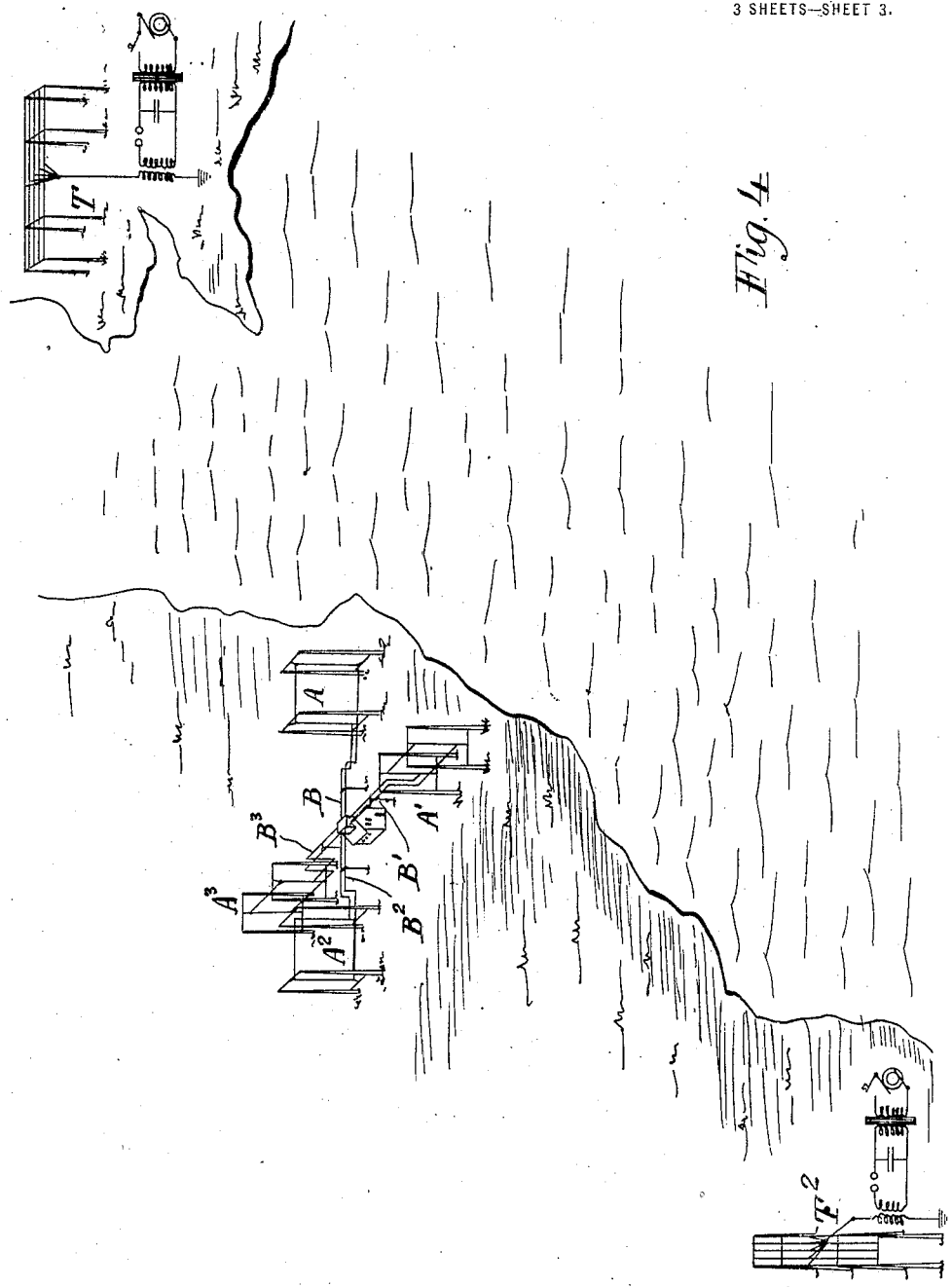

UNITED STATES PATENT OFFICE.

ROY ALEXANDER WEAGANT, OF NEW YORK, N. Y., ASSIGNOR, BY MESNE ASSIGNMENTS, TO RADIO CORPORATION OF AMERICA, A CORPORATION OF DELAWARE.

RADIOSIGNALING APPARATUS.

1,389,800.  Specification of Letters Patent.  Patented Sept. 6, 1921.

Application filed February 1, 1918. Serial No. 214,827.

*To all whom it may concern:*

Be it known that I, ROY ALEXANDER WEAGANT, a citizen of the United States, and resident of Douglas Manor, county of Queens, city and State of New York, have invented certain new and useful Improvements in Radiosignaling Apparatus, of which the following is a specification accompanied by drawings.

This invention relates to radio signaling apparatus of the same general character as that disclosed in my co-pending application, Serial Number 181,458, filed July 19, 1917, for a method and apparatus for eliminating interference with radio communication due to atmospheric or "static" disturbances.

In that application, I disclosed broadly a preferred method and means for carrying out the invention, with antennæ for receiving from a given distant transmitting station. The object of the present invention is to enable the method to be carried out with apparatus including separated antennæ, adapted to receive horizontally propagated waves in a plurality of directions, so that the signals may be received from different transmitting stations in different directions without material static interference. In this respect the present invention is a modification of my basic invention.

The accompanying drawings are illustrative of preferred forms of apparatus for carrying out the invention in which, Figure 1, is a diagrammatic representation of circuits and apparatus embodying the invention.

Figs. 2 and 3, are similar views of modifications, and

Fig. 4, shows the disposition of the receiving station with relation to a plurality of distant transmitting stations.

Figure 1:
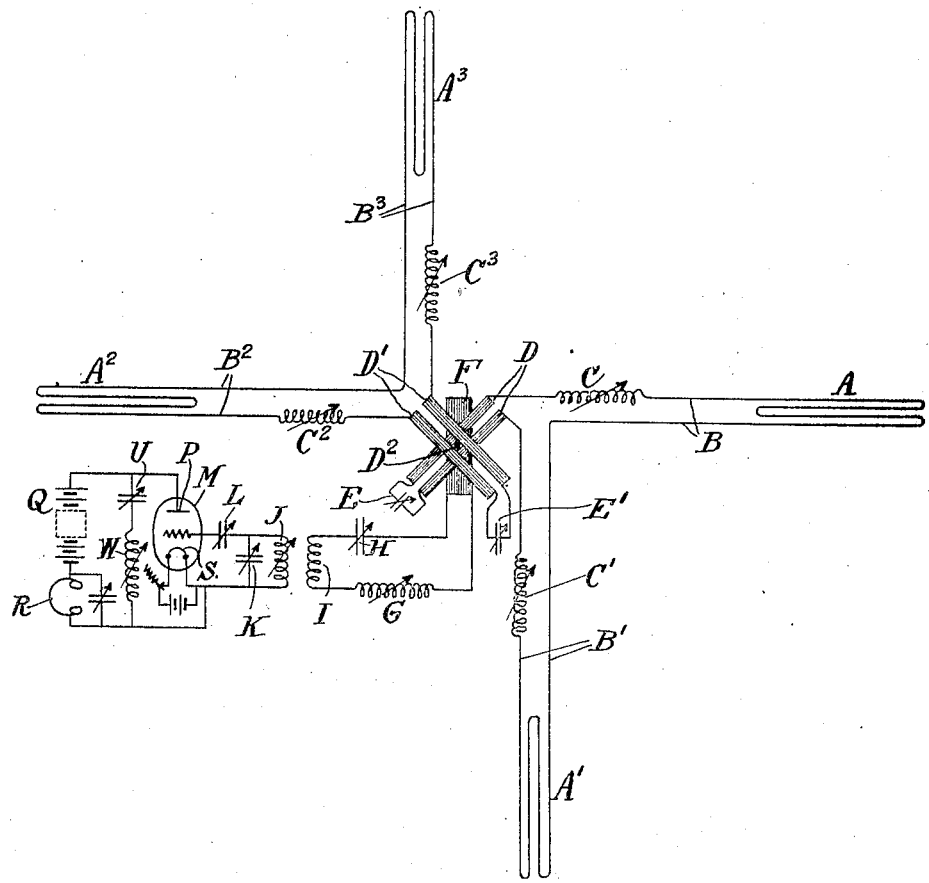

As disclosed in detail in my co-pending application referred to, I employ a plurality of antennæ, so located and adjusted that static effects will produce currents therein substantially similar in phase, while signal impulses will produce currents dissimilar in phase. I am thus enabled, by suitable circuits and apparatus, to detect the signals while eliminating the interference due to the static disturbances.

Referring to the drawings, and more especially to Figs. 1 and 4, $A\ A'$ and $A^2\ A^3$ represent two separated antennæ, shown in this instance, by way of illustration, as loop antennæ, the loops of each antenna being shown at an angle to each other, preferably at right angles, for convenience. The antenna elements $A\ A^2$ and $A'\ A^3$ are preferably in substantially the same or parallel planes as shown, while the plurality of distant transmitting stations $T\ T^2$, from which signals are to be received, may be located respectively in the general direction of the planes of the antenna elements $A\ A^2$ and $A'\ A^3$, but not necessarily in the same planes with these pairs of elements.

Pairs of leads $B\ B'\ B^2\ B^3$ extend from the antennæ to a receiving station provided with suitable receiving apparatus, for discriminating between the effects due to received signal waves and heterogeneous waves in the manner described. Each of the pairs of leads, $B\ B'\ B^2\ B^3$, has included therein suitable tuning inductances $C\ C'\ C^2\ C^3$, from which connections lead to pairs of coils $D\ D'$, the circuits of the coils $D\ D'$ being shown completed through capacity elements or variable condensers $E\ E'$.

Within the space effected by the coils $D\ D'$, and preferably rotatably mounted on an axis $D^2$, parallel to the planes of the coils $D\ D'$, is a coil F, which is subjected to the fields of force set up in coils $D\ D'$, and which is suitably connected to the detecting and indicating circuits. By suitably connecting the coils and adjusting the angular position of coil F, the effects due to the static disturbances neutralize or are combined differentially in the coil F, while the effects due to the signal waves combine cumulatively to produce a resultant current in coil F.

If signals are being sent from station T, for instance, then the antenna loops A and $A^2$ are receiving, but static disturbances do not affect the signals. When the loops $A'$ and $A^3$ are receiving from station $T^2$, the static is also eliminated, in accordance with my discovery and the theories upon which that discovery is based, as set forth at length in my co-pending application hereinbefore referred to.

The detecting and indicating circuits may be of any suitable or desirable type and as shown the coil F is connected through suitable loading inductance G, condenser H, and coupling coil I, to the detector. In the arrangement shown this circuit, F G H I, is tuned to the frequency of the incoming signal.

The detector shown in this instance as a three-element vacuum valve M, is connected to the oscillatory circuit, J K, coupled to the coil I. The circuits associated with the detector M may be as shown, including, in addition to the usual plate circuit, P Q R S, an oscillatory circuit P U W S.

In the modification of the apparatus shown in Fig. 2, the antennæ instead of being in the form of loops are straight antennæ, and I have found that the antennæ, if in the form of straight wires, plates, or a network, may be laid horizontally, or substantially horizontally, instead of in an elevated position. In Fig. 2 it is to be assumed that antennæ elements $a\ a'$ and $a^2\ a^3$ are substantially horizontally arranged instead of in a vertical position. The coil D is connected to the antenna $a\ a'$ and the coil $D'$ is connected to the antenna $a^2\ a^3$. The inductances $c$, $c'$ $c^2$ and $c^3$ and the variable capacity elements in the form of condensers $e$, $e'$, $e^2$ and $e^3$ are preferably connected in the respective leads $b$, $b'$, $b^2$ and $b^3$ connecting the antennæ with the coils D D'.

In the modification shown in Fig. 3 the same arrangement as that indicated in Fig. 2 is illustrated, except that different forms of antennæ are shown. The antennæ 2 and 5 are in the form of closed loops, connected by the leads $b$ and $b^2$ to the coils D D', respectively. The antenna 4 is in the form of a plate connected by lead $b^3$ to the coil D', while the antenna 3 is in the form of a network, connected by lead $b'$ to the coil D. These loop, or plate, or network antennæ may be arranged vertically or horizontally, as desired; in either case I found that I am enabled to substantially eliminate static interference with the signals.

I claim and desire to obtain, by Letters Patent, the following:

1. In combination, at a radio receiving station, a plurality of separated antennæ, tuned to the same frequency and adapted to receive horizontally propagated waves in a plurality of directions, and receiving apparatus for utilizing the signal waves, including means for eliminating the interference due to static disturbances.

2. In combination, at a radio receiving station, a plurality of separated antennæ, situated at a distance apart equal to an appreciable fraction of a wave length and adapted to receive horizontally propagated waves in a plurality of directions and receiving apparatus for utilizing the signal waves, including means for eliminating the interference due to static disturbances.

3. In combination, at a radio receiving station, a plurality of separated antennæ, situated at a distance apart equal to an appreciable fraction of a wave length and adapted to receive horizontally propagated waves in a plurality of directions, and receiving apparatus common to said antennæ for utilizing the signal waves, including means for eliminating the interference due to static disturbances.

4. In combination at a radio receiving station an antenna system comprising two open antenna wires disposed horizontally and extending an appreciable fraction of a wave length in opposite directions, said wires having adjacent ends connected to a common receiver comprising means for balancing out static and combining the out of phase currents set up in said wires to produce a signal.

5. In combination, at a radio receiving station, a plurality of separated antennæ, situated at a distance apart equal to an appreciable fraction of a wave length and adapted to receive horizontally propagated waves in a plurality of directions, and receiving apparatus common to said antennæ for utilizing the signal waves, including means for neutralizing the effects in the antennæ of static disturbances, thereby reducing static interference.

6. An antenna system comprising a plurality of antennæ including one pair effectively separated an appreciable fraction of a wave length in one desired direction of reception of the signal, and another pair effectively separated an appreciable fraction of a wave length in a direction at an angle to that of the first pair, each antenna being directional in the line of the pair in which it is arranged and cumulatively combining the signal to a greater extent than the interference.

7. In combination, at a radio receiving station, a plurality of separated antennæ tuned to the same frequency, and situated at a distance apart equal to an appreciable fraction of a wave length, said antennæ being adapted to receive horizontally propagated waves in a plurality of directions, and receiving apparatus common to said antennæ for utilizing the signal waves, including means for neutralizing the effects in the antennæ of static disturbances, thereby reducing static interference.

8. In combination, at a radio receiving station, a plurality of antennæ separated by an appreciable fraction of a wave length, each antenna having portions arranged at an angle to each other whereby they are adapted to receive horizontally propagated waves in a plurality of directions, and receiving apparatus common to said antennæ for utilizing the signal waves, including means for balancing out the currents in the antennæ due to static disturbances, thereby reducing static interference.

In testimony whereof I have signed this specification in the presence of two subscribing witnesses.

ROY ALEXANDER WEAGANT.

Witnesses:
HERBERT G. OGDEN,
J. BOTTOMLEY.